US011763544B2

(12) United States Patent
Zhao et al.

(10) Patent No.: US 11,763,544 B2
(45) Date of Patent: Sep. 19, 2023

(54) DENOISING AUTOENCODER IMAGE CAPTIONING

(71) Applicant: International Business Machines Corporation, Armonk, NY (US)

(72) Inventors: Shiwan Zhao, Beijing (CN); Hao Kai Zhang, Harbin (CN); Yi Ke Wu, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 16/922,155

(22) Filed: Jul. 7, 2020

(65) Prior Publication Data

US 2022/0012534 A1 Jan. 13, 2022

(51) Int. Cl.
*G06V 10/30* (2022.01)
*G06N 20/00* (2019.01)
(Continued)

(52) U.S. Cl.
CPC .......... *G06V 10/30* (2022.01); *G06F 18/217* (2023.01); *G06F 18/2113* (2023.01); *G06F 18/2148* (2023.01); *G06F 18/22* (2023.01); *G06N 20/00* (2019.01); *G06V 10/761* (2022.01); *G06V 10/764* (2022.01); *G06V 10/771* (2022.01); *G06V 10/776* (2022.01); *G06V 10/7747* (2022.01)

(58) Field of Classification Search
CPC .... G06K 9/6257; G06K 9/6215; G06K 9/623; G06K 9/6262; G06N 20/00; G06V 10/30
USPC ........................................................ 382/157
See application file for complete search history.

(56) References Cited

U.S. PATENT DOCUMENTS 10,003,483 B1 * 6/2018 Migliori .............. H04L 27/0012
11,151,334 B2 * 10/2021 Rezagholizadeh .... G06N 3/084
(Continued)

FOREIGN PATENT DOCUMENTS

CN      110166779 B    6/2021
WO    2017151757 A1    9/2017

OTHER PUBLICATIONS

Specia et al., "A Shared Task on Multimodal Machine Translation and Crosslingual Image Description", Proceedings of the First Conference on Machine Translation, vol. 2: Shared Task Papers, pp. 543-553, Berlin, Germany, Aug. 11-12, 2016, © 2016 Association for Computational Linguistics.

(Continued)

*Primary Examiner* — Michael R Neff
(74) *Attorney, Agent, or Firm* — Randy Tejeda (57) ABSTRACT

In an approach to augmenting a caption dataset by leveraging a denoising autoencoder to sample and generate additional captions from the ground truth captions, one or more computer processors generate a plurality of new captions utilizing an autoencoder fed with one or more noisy captions, wherein the autoencoder is trained with a dataset comprising a plurality of ground truth captions. The one or more computer processors calculate an importance weight for each new caption in the plurality of generated new captions as compared to a plurality of associated ground truth captions based on a consensus metric. The one or more computer processors train a caption model with the generated plurality of new captions and associated calculated weights.

20 Claims, 4 Drawing Sheets

(51) Int. Cl.
G06F 18/214 (2023.01)
G06F 18/22 (2023.01)
G06F 18/21 (2023.01)
G06F 18/2113 (2023.01)
G06V 10/74 (2022.01)
G06V 10/764 (2022.01)
G06V 10/771 (2022.01)
G06V 10/774 (2022.01)
G06V 10/776 (2022.01)

(56) References Cited

U.S. PATENT DOCUMENTS

| | | | |
|---|---|---|---|
| 2018/0143966 A1 | 5/2018 | Lu | |
| 2018/0144208 A1 | 5/2018 | Lu | |
| 2018/0144248 A1 | 5/2018 | Lu | |
| 2018/0165554 A1* | 6/2018 | Zhang | G06K 9/6256 |
| 2018/0322368 A1* | 11/2018 | Zhang | G06V 10/82 |
| 2019/0130221 A1 | 5/2019 | Bose | |
| 2019/0220691 A1* | 7/2019 | Valpola | G06N 3/08 |
| 2019/0286073 A1 | 9/2019 | Hosseini-Asl | |
| 2019/0286931 A1 | 9/2019 | Kim | |
| 2020/0026960 A1 | 1/2020 | Park | |
| 2020/0111194 A1 | 4/2020 | Wang | |
| 2021/0012486 A1 | 1/2021 | Huang | |
| 2021/0067735 A1 | 3/2021 | Reda | |
| 2021/0287430 A1 | 9/2021 | Li | |
| 2022/0014807 A1* | 1/2022 | Lin | G06N 3/0445 |

OTHER PUBLICATIONS

Miyazaki et al., "Cross-Lingual Image Caption Generation", Proceedings of the 54th Annual Meeting of the Association for Computational Linguistics, pp. 1780-1790, Berlin, Germany, Aug. 7-12, 2016. © 2016 Association for Computational Linguistics.
Yun et al., "CutMix: Regularization Strategy to Train Strong Classifiers with Localizable Features", arXiv:1905.04899v1 [cs.CV] May 13, 2019, 14 pages.
Aldabbas et al., "Data Augmentation to Stabilize Image Caption Generation Models in Deep Learning" International Journal of Advanced Computer Science and Applications, vol. 10, No. 10, 2019, 9 pages.
Takahashi et al., "Data Augmentation using Random Image Cropping and Patching for Deep CNNs", Journal of Latex Class Files, vol. 14, No. 8, Aug. 2015, arXiv:1811.09030v2 [cs.CV] Aug. 27, 2019, 16 pages.
Liu et al., "Generating Diverse and Descriptive Image Captions Using Visual Paraphrases", Printed Jun. 17, 2020, 10 pages.
Jaffe, Alan, "Generating Image Descriptions using Multilingual Data", Proceedings of the Conference on Machine Translation (WMT), vol. 2: Shared Task Papers, pp. 458-464, Copenhagen, Denmark, Sep. 7-11, 2017, © 2017 Association for Computational Linguistics.
Dong et al., "I2T2I: Learning text to image synthesis with textual data augmentation", arXiv:1703.06676v3 [cs.CV] Jun. 3, 2017, 6 pages.
Wang et al., "Image Captioning with Deep Bidirectional LSTMs", © 2016 ACM. ISBN 978-1-4503-3603-1/16/10, embedarXiv:1604.00790v3 [cs.CV] Jul. 20, 2016, 11 pages, <http://dx.doi.org/10.1145/2964284.2964299>.
Summers et al., "Improved Mixed-Example Data Augmentation", arXiv:1805.11272v2 [cs.CV] Jun. 1, 2018, 7 pages.
Wu et al., "Improving Captioning for Low-Resource Languages by Cycle Consistency", arXiv:1908.07810v1 [cs CL] Aug. 21, 2019, 6 pages.
Cui et al., "Learning to Evaluate Image Captioning", Printed Jun. 17, 2020, 9 pages.
Shokri et al., "Membership Inference Attacks Against Machine Learning Models", arXiv:1610.05820v2 [cs.CR] Mar. 31, 2017, 16 pages.
Feng et al., "Unsupervised Image Captioning", arXiv:1811.10787v2 [cs.CV] Apr. 6, 2019, 10 pages.
Kim et al., "Variational Autoencoder-Based Multiple Image Captioning Using a Caption Attention Map", Appl. Sci. 2019, 9, 2699; doi:10.3390/app9132699, 12 pages, <http://www.mdpi.com/journal/applsci>.
Vincent et al., "Extracting and Composing Robust Features with Denoising Autoencoders", Appearing in Proceedings of the 25th International Confer-ence on Machine Learning, Helsinki, Finland, 2008, Copy-right 2008 by the author(s)/owner(s), 3 pages.
Vinyals et al., "Show and Tell: Neural Image Caption Generator", arXiv:1411.4555v2 [cs.CV] Apr. 20, 2015, 9 pages.
Wang et al., "Image Captioning with Deep Bidirectional LSTMs and Multi-Task Learning", Apr. 2018, 3 pages, <https://doi.org/10.1145/3115432>.
Appendix P—List of IBM Patents or Patent Applications Treated as Related, Filed herewith, 2 Pages.
Zhao et al., "Mixup Image Captioning", Filed herewith, 27 pages.
Zhao et al., "Adaptive Cycle Consistency Multimodal Image Captioning", Filed herewith, 29 pages.
Zhang et al., "Bag of Freebies for Training Object Detection Neural Networks", Apr. 12, 2019, arXiv:1902.04103v3 [cs.CV], 9 pages.
Zhang et al., "mixup: Beyond Empirical Risk Minimization", Published as a conference paper at ICLR 2018, Apr. 27, 2018, arXiv:1710.09412v2 [cs.LG], 13 pages.

* cited by examiner

|  | BLEU-4 | METEOR | CIDEr |
|---|---|---|---|
| Baseline | 19.17 | 18.01 | 38.39 |
| DAE | 20.28 | 18.61 | 40.69 |

DENOISING AUTOENCODER IMAGE CAPTIONING

BACKGROUND

The present invention relates generally to the field of machine learning, and more particularly to image captioning.

Image captioning is the process of generating textual description of an image.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

SUMMARY

Embodiments of the present invention disclose a computer-implemented method, a computer program product, and a system for augmenting a caption dataset by leveraging a denoising autoencoder to sample and generate additional captions from the ground truth captions. The computer-implemented method includes one or more computer processors generating a plurality of new captions utilizing an autoencoder fed with one or more noisy captions, wherein the autoencoder is trained with a dataset comprising a plurality of ground truth captions. The one or more computer processors calculate an importance weight for each new caption in the plurality of generated new captions as compared to a plurality of associated ground truth captions based on a consensus metric. The one or more computer processors train a caption model with the generated plurality of new captions and associated calculated weights.

DETAILED DESCRIPTION

Traditionally, automatic image caption generation is a crucial and challenging task demanding both effective visual recognition and linguistic interpretation. Image caption generation models require substantial amounts of training data (e.g., exponentially increasing with problem complexity) to ensure model accuracy and precision dependent on number of classes, number of input features, and number of model parameters. Frequently said models assume there is sufficient training data, but in practice, there are many instances and situations where required training data is unavailable or prohibitively expensive. This issue is sufficiently expounded with regards to uncommon languages or languages with limited training sets. Generally, a well-trained model should allow for generalization using training data to any data from a problem domain. Models trained with insufficient training data do not generalize and suffer from low accuracy and precision due to overfitting and underfitting. Traditionally, overfitting occurs when a model learns the detail and noise in the training data to an extent that it negatively impacts model performance with respect new data. Underfitted models neither accurately represent the training data nor generalize to new data. The cost of creating and maintaining a caption dataset is substantially higher than that of standard classification dataset, since annotating an image with a caption involves more complex cognitive and inferential efforts. Said cost is substantially increased for infrequently utilized or uncommon languages where dataset scales are especially limited leading to poor performing image captioning systems.

Embodiments of the present invention provide solutions that lower costs related to capturing/maintaining a caption dataset and that improve the performance of image captioning systems. Specifically, embodiments of the prevent invention augment a caption dataset by leveraging a denoising autoencoder to sample and generate a plurality of additional captions from a set of ground truth captions. Embodiments of present invention add noise to the one or more ground truth captions. Embodiments of the present invention feed noisy captions into a denoising autoencoder to reconstruct new captions containing features of the corresponding noisy captions. Embodiments of the present invention generate one or more captions for one or more subsequent images utilizing a caption model trained with generated captions from a trained denoising autoencoder. Embodiments of the present invention calculate an importance utilizing Consensus-based Image Description Evaluation (CIDEr) compared with one or more ground truth captions. Embodiments of the present invention train a caption model utilizing the generated sentences with associated importance weights. Embodiments of the present invention reduce training requirements of a model by augmenting the caption dataset with a plurality of captions. Embodiments of the present invention increases the performance of captioning models and reduces the resources expended in collecting and maintaining a caption dataset. Implementation of embodiments of the invention may take a variety of forms, and exemplary implementation details are discussed subsequently with reference to the Figures.

The present invention will now be described in detail with reference to the Figures.

Figure 1:
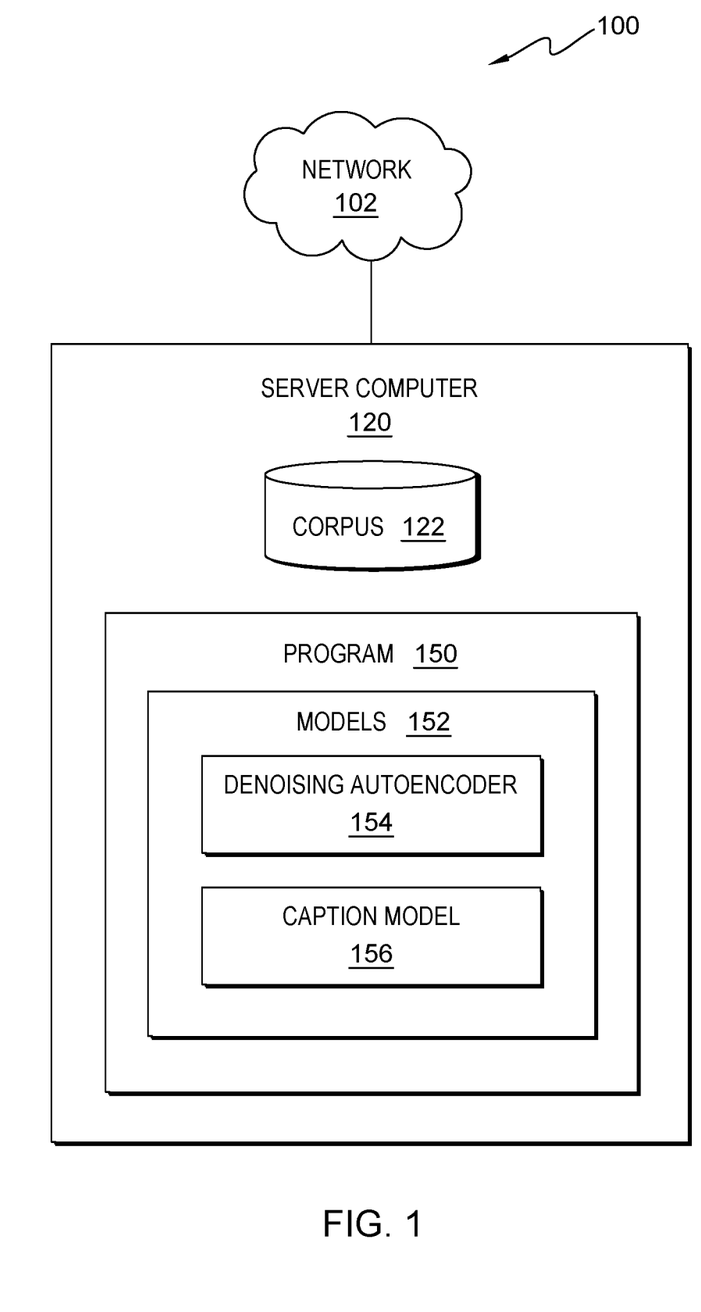
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. In an embodiment, corpus 122 is a database comprising an organized collection of data. Corpus 122 can be implemented with any type of storage device capable of storing data and configuration files that can be accessed and utilized by program 150, such as a database server, a hard disk drive, or a flash memory. In an embodiment, corpus 122 stores data used by program 150, such as datasets, data points, sets of training data (i.e., training data), data structures, and/or variables used to fit the parameters or hyperparameters of a model. In an embodiment, corpus 122 may contain one or more sets containing a plurality of classified datapoints (i.e., captions (i.e., textual representations of identified objects)), hereinafter referred to as datapoints (e.g., training statements) or a dataset (e.g., training set). In another embodiment, a dataset contains an array of training statements organized in labelled training sets. For example, a dataset includes a plurality of images of fruit and associated captions that textually describe the fruit identified in the image plurality. In a further embodiment, corpus 122 contains vectorized (i.e., one-hot encoding, dimension reduced, etc.) images and associated captions. In an embodiment, corpus 122 contains images with an associated plurality of ground-truth captions. For example, an image is associated with the following sets of ground truth captions, all representing the image accurately: "A brown dog is running after the black dog", "Two dogs run toward each other", "A brown dog is running after a black dog", "Two dogs run across shells near a body of water", and "Two dogs playing on a beach".

Models 152 is representative of one or more captioning models utilizing machine learning algorithms and/or deep learning models. In the depicted embodiment, models 152 contains one or more transferrable neural networks algorithms and models (e.g., autoencoders, recurrent neural network (RNN), long short-term memory (LSTM), deep stacking network (DSN), deep belief network (DBN), convolutional neural networks (CNN), compound hierarchical deep models, etc.) trained with supervised methods. In the depicted embodiment, models 152 contains denoising autoencoder 154 and caption model 156. Here, denoising autoencoder 154 is an autoencoder trained and utilized to learn efficient data encodings. In the depicted embodiment, program 150 utilizes denoising autoencoder 154 to encode a noisy caption into a plurality of reconstructed captions that each contain features present in noisy captions. Here, denoising autoencoder 154 learns to utilize one or more noisy captions to create a plurality of additional captions. In an embodiment, caption model 156 is an RNN utilized to generate one or more natural language captions representing one or more objects contained in one or more images. The training of models 152 is depicted and described in further detail with respect to FIG. 2.

Program 150 is a program for augmenting a caption dataset by leveraging a denoising autoencoder to sample and generate additional captions from the ground truth captions. In various embodiments, program 150 may implement the following steps: generate a plurality of new captions utilizing an autoencoder fed with one or more noisy captions, wherein the autoencoder is trained with a dataset comprising a plurality of ground truth captions; calculate an importance weight for each new caption in the plurality of generated new captions as compared to a plurality of associated ground truth captions based on a consensus metric; train a caption model with the generated plurality of new captions and associated calculated weights. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
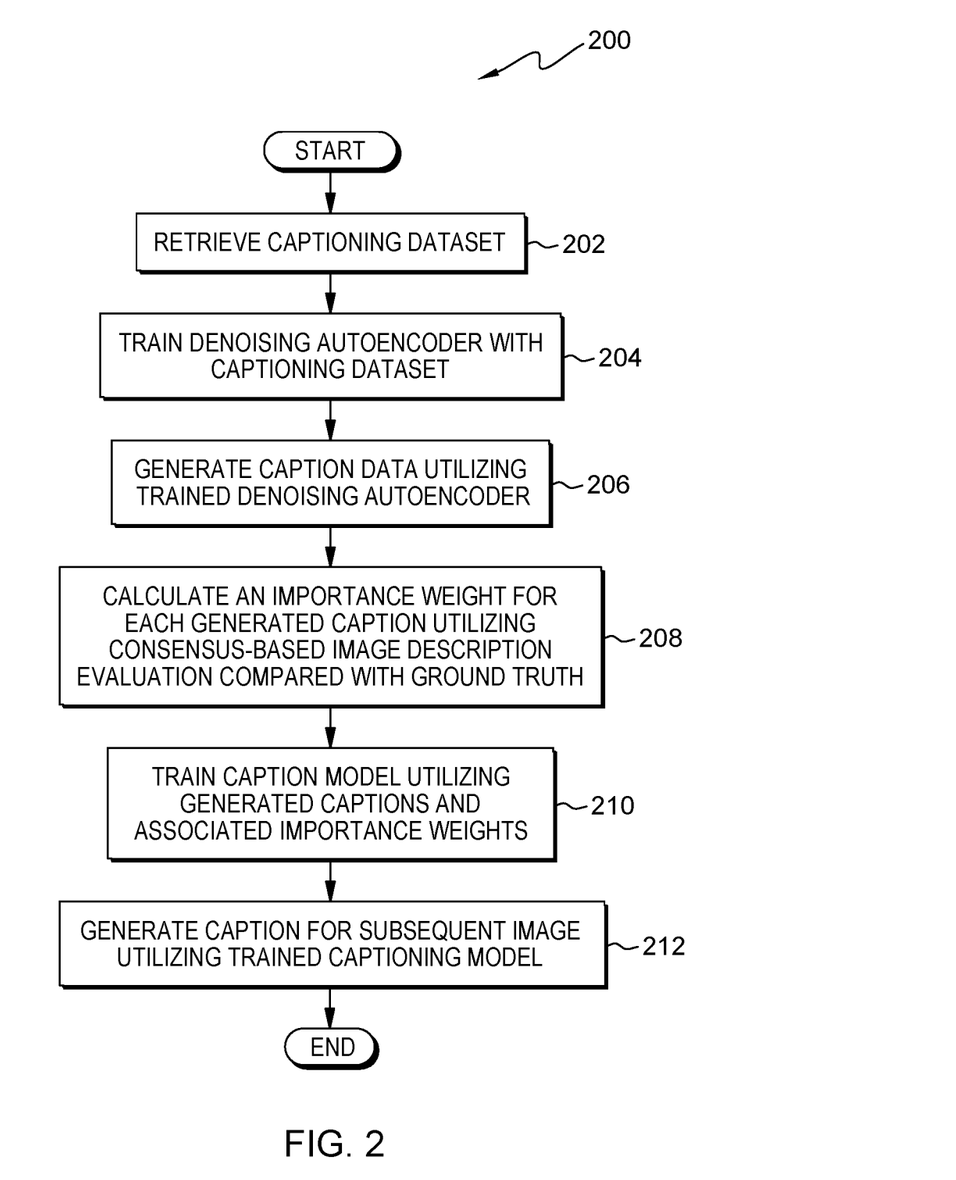
FIG. 2 is a flowchart depicting operational steps of a program, on a server computer within the computational environment of FIG. 1, augmenting a caption dataset by leveraging a denoising autoencoder to sample and generate additional captions from the ground truth captions, in accordance with an embodiment of the present invention.

FIG. 2 is a flowchart depicting operational steps of program 150 for augmenting a caption dataset by leveraging a denoising autoencoder to sample and generate additional captions from the ground truth captions, in accordance with an embodiment of the present invention.

Program 150 retrieves a dataset (step 202). In an embodiment, program 150 initiates responsive to a detected corpus, a subsequent image captioning request, or by user request (e.g., user inputs training set). In another embodiment, program 150 initiates when detecting or receiving dataset or one or more (e.g., a plurality) training sets. Here, the dataset contains a plurality of datapoints wherein each datapoint comprises an image and associated caption. In various embodiments, program 150 retrieves the dataset from corpus 122. In another embodiment, program 150 retrieves a dataset a plurality of sources, such as a publicly available external source, and stores said information within corpus 122. For example, program 150 retrieves a set of images with identified objects and associated captions from an online caption repository.

Program 150 trains a denoising autoencoder with a caption dataset (step 204). In an embodiment, program 150 utilizes the retrieved dataset (i.e., caption dataset) to train a denoising autoencoder (e.g., denoising autoencoder 154) utilizing unsupervised learning techniques, such as applying backpropagation where targets values are set to the input values. In an embodiment, program 150 trains the denoising autoencoder to calculate a function that accurately approximates an identify function, such that the output of the encoder contains features contained in the original input. In another embodiment, program 150 utilizes the trained autoencoder to discover correlations between input features in a low dimensional representation.

Program 150 generates captions utilizing the trained denoising autoencoder (step 206). In an embodiment, program 150 generates one or more new captions utilizing the trained denoising autoencoder inputted (i.e., fed) with noisy captions. In various embodiments, program 150 utilizes the retrieved caption dataset and creates a plurality of subsets containing a plurality of ground truth captions. In an embodiment, program 150 limits the feature information in each created subset, thus compacting the input feature representations. Program 150 adds noise to each ground truth caption in each created subset of captions. In an embodiment, noise is modified into one or more captions or noise is applied during the training and model utilization process. In an embodiment, program 150 applies dropout regularization to each caption in a subset, where program 150 randomly zeros out a portion of features and units during training. In another embodiment, program 150 utilizes (e.g., adds) stochastic depth to add noise. In this embodiment, stochastic depth is applied at a layer level rather than unit level. In another embodiment, program 150 utilizes variational autoencoders to add Gaussian noise to one or more hidden layers within the trained denoising autoencoders. Responsively, program 150 inputs a plurality of noisy captions into the trained autoencoder. In an embodiment, program 150 utilizes the trained autoencoder to reconstruct noisy captions into a plurality of captions comprising features and correlations contained in the noisy caption and the original caption (e.g., pre-noise caption). In an embodiment, program 150 utilizes the described process to generate a multitude of new captions utilizing a smaller set of ground truth captions.

Program 150 calculates an importance weight for each generated caption utilizing consensus-based image description evaluation (CIDEr) compared with ground truth (step 208). In an embodiment, program 150 utilizes a consensus metric to calculate and/or measure a similarity (e.g., numerical value) of a generated caption compared to a plurality of ground truth captions (e.g., reference captions). In this embodiment, the similarity is calculated from the average cosine similarity between a generated caption and one or more ground truth captions. In an embodiment, program 150 utilizes CIDEr to automatically evaluate a caption for how well the caption matches a consensus of a set of ground truths for a specific image. In another embodiment, program 150 utilizes equation (1) to calculate an importance weight for each generated sentence compared to a set of ground truths:

$$W(y) = \frac{1}{Z(y^*; \tau)} \exp\{r(y, y^*)/\tau\] \quad (1)$$

With respect to equations (1) and (2), y is a generated caption (i.e., natural language), y* is a ground truth caption, τ is a control parameter, and r(y, y*) is a risk function (e.g., importance weight based on CIDEr). In various embodiments, program 150 utilizes equations (1) to generate an importance weight for each generated caption and/or an importance weight for each element (i.e., word) in a generated caption. In various embodiments, program 150 calculates an importance weight for each ngram (e.g., word or sequence) contained in a generated sentence where higher weighted ngrams are more informative (i.e., not commonly occurring across a dataset). Responsively, program 150 associates an importance weight for each generated caption and/or for each ngram in each generated caption.

Program 150 trains captioning model utilizing generated captions and associated importance weights (step 210). In an embodiment, program 150 creates, initializes, and trains one or more models (e.g., models 152) utilizing the generated captions, as described in step 206. Program 150 initializes a captioning model utilizing one or more importance weights associated with one or more generated captions. In an alternative embodiment, program 150 further includes one or more weights calculated from a preprocessing function such as tf-idf. In yet another embodiment, program 150 performs supervised training on the captioning model with the labeled vectorized data (i.e., image and caption pairs). For example, program 150 feeds image and caption pairs into one or more models, allowing program 150 to make inferences between the problem data (e.g., images) and the solution data (i.e., captions). In the depicted embodiment, program 150 creates, initializes, and trains a language generating RNN (e.g., caption model 156) with the retrieved dataset and the generated captions. In this embodiment, program 150 utilizes the trained RNN to generate natural language captions representing one or more identified objects contained in an image.

Program 150 generates a caption for a subsequent image utilizing trained captioning model (step 212). In another embodiment, program 150 utilizes the trained RNN (e.g., caption model 156) to generates a caption for a subsequent inputted image with identified objects. In this embodiment, program 150 constructs one or more words, chains, and/or sentences containing natural language representations of the image and identified objects. In one embodiment, program 150 generates a series of captions and associated probabilities. Said probabilities denote the chance that the predicted word is the next word in a sequence. In an embodiment, program 150 selects the most probable word (e.g., the word with the highest attached probability). In another embodiment, program 150 prompts the user with the top predicted words and allows the user to select the next word. In an embodiment, responsive to user feedback and/or newly generated images and captions, program 150 adds the generated image and associated caption to the augmented dataset and retrains one or more associated models.

In an embodiment, program 150 deploys one or more trained models to a production environment or server. In various embodiments, program 150 may select multiple ranked models and deploy the models to the same production environment or deploy the models to a plurality of respective production, test, or auxiliary environments. In another embodiment, program 150 selected a deployment environment to deploy one or more trained models out of a plurality of deployment environments (e.g., test, production, backup server, containers, or virtual machines). In an embodiment, the user instructs program 150 to deploy a specific model.

Figure 3:
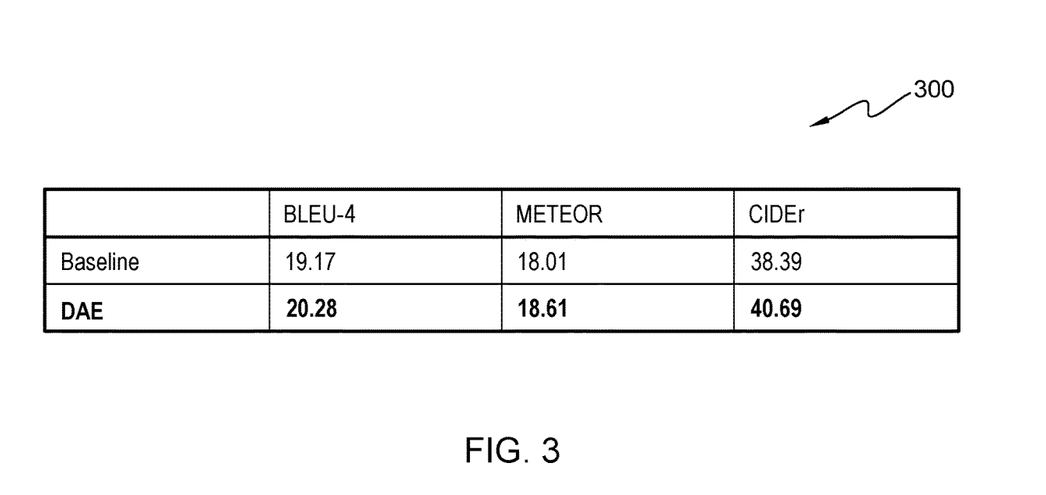
FIG. 3 depicts an exemplary table, in accordance with an embodiment of the present invention.

FIG. 3 depicts chart 300, in accordance with an illustrative embodiment of the present invention. Chart 300 contains testing results from a plurality of machine learning benchmark such as bilingual evaluation understudy (BLEU-4), metric for evaluation of translation with explicit ordering (METEOR), consensus-based image description evaluation (CIDEr), each evaluating a plurality of models trained with a baseline dataset and an augmented dataset, as described in step 210. Chart 300 demonstrates that model evaluations, as described above, are significantly increased when utilizing an augmented dataset, as described in FIG. 2.

Figure 4:
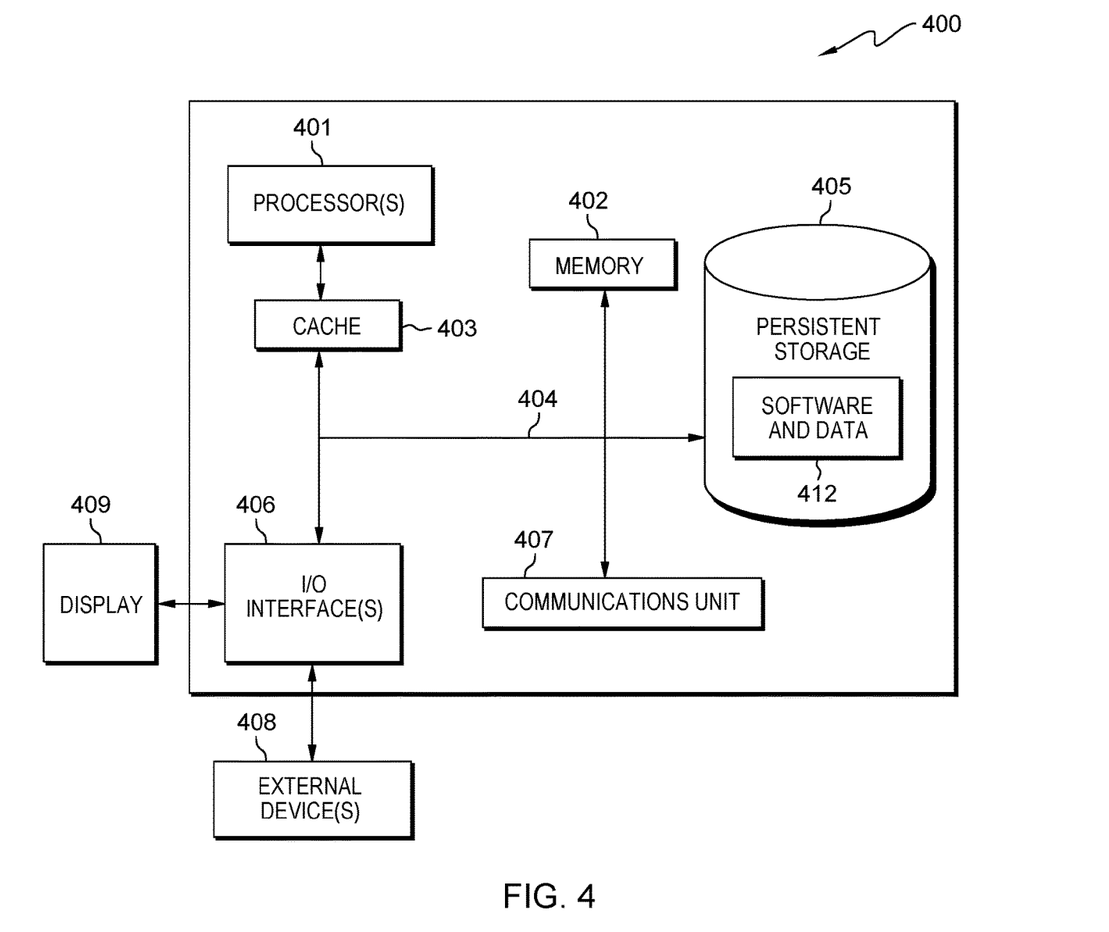
FIG. 4 is a block diagram of components of the server computer, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to a subsequent image captioning request, generating, by one or more computer processors, a plurality of new captions utilizing an autoencoder fed with one or more noisy captions, wherein the autoencoder is trained with a dataset comprising a plurality of ground truth captions, by:
   reconstructing, by one or more computer processors, the one or more noisy captions into the plurality of new captions each comprising features and correlations contained in the one or more noisy captions and an original caption;
   calculating, by one or more computer processors, an importance weight for each new caption in the plurality of generated new captions as compared to a plurality of associated ground truth captions based on a consensus metric; and
   training, by one or more computer processors, a caption model with the generated plurality of new captions and associated calculated weights.

2. The method of claim 1, further comprising:
   generating, by one or more computer processors, a subsequent caption for a subsequent image utilizing the trained caption model.

3. The method of claim 1, further comprising:
   adding, by one or more computer processors, stochastic depth as noise to each ground truth caption in the plurality of ground truth captions within one or more hidden layers contained in the trained autoencoder.

4. The method of claim 1, further comprising:
   applying, by one or more computer processors, dropout regularization to each ground truth caption in the plurality of ground truth captions.

5. The method of claim 1, wherein the consensus metric utilizes consensus-based image description evaluation.

6. The method of claim 1, wherein the consensus metric is an average cosine similarity between one or more generated captions and one or more associated ground truth captions.

7. The method of claim 1, wherein the autoencoder is a denoising autoencoder.

8. The method of claim 1, wherein the trained caption model is a recurrent neural network.

9. A computer program product comprising:
   one or more computer readable storage media and program instructions stored on the one or more computer readable storage media, the stored program instructions comprising:
   responsive to a subsequent image captioning request, program instructions to generate a plurality of new captions utilizing an autoencoder fed with one or more noisy captions, wherein the autoencoder is trained with a dataset comprising a plurality of ground truth captions, by:
   program instructions to reconstruct the one or more noisy captions into the plurality of new captions each comprising features and correlations contained in the one or more noisy captions and an original caption;
   program instructions to calculate an importance weight for each new caption in the plurality of generated new captions as compared to a plurality of associated ground truth captions based on a consensus metric; and
   program instructions to train a caption model with the generated plurality of new captions and associated calculated weights.

10. The computer program product of claim 9, wherein the program instructions, stored on the one or more computer readable storage media, further comprise:
    program instructions to generate a subsequent caption for a subsequent image utilizing the trained caption model.

11. The computer program product of claim 9, wherein the program instructions, stored on the one or more computer readable storage media, further comprise:
    program instructions to add stochastic depth as noise to each ground truth caption in the plurality of ground truth captions within one or more hidden layers contained in the trained autoencoder.

12. The computer program product of claim 9, wherein the program instructions, stored on the one or more computer readable storage media, further comprise:
    program instructions to apply dropout regularization to each ground truth caption in the plurality of ground truth captions.

13. The computer program product of claim 9, wherein the consensus metric utilizes consensus-based image description evaluation.

14. The computer program product of claim 9, wherein the consensus metric is an average cosine similarity between one or more generated captions and one or more associated ground truth captions.

15. A computer system comprising:

one or more computer processors;

one or more computer readable storage media; and program instructions stored on the computer readable storage media for execution by at least one of the one or more processors, the stored program instructions comprising:

program instructions to generate a plurality of new captions utilizing an autoencoder fed with one or more noisy captions, wherein the autoencoder is trained with a dataset comprising a plurality of ground truth captions, by:

program instructions to reconstruct the one or more noisy captions into the plurality of new captions each comprising features and correlations contained in the one or more noisy captions and an original caption;

program instructions to calculate an importance weight for each new caption in the plurality of generated new captions as compared to a plurality of associated ground truth captions based on a consensus metric; and program instructions to train a caption model with the generated plurality of new captions and associated calculated weights.

16. The computer system of claim 15, wherein the program instructions, stored on the one or more computer readable storage media, further comprise:

program instructions to generate a subsequent caption for a subsequent image utilizing the trained caption model.

17. The computer system of claim 15, wherein the program instructions, stored on the one or more computer readable storage media, further comprise:

program instructions to add stochastic depth as noise to each ground truth caption in the plurality of ground truth captions within one or more hidden layers contained in the trained autoencoder.

18. The computer system of claim 15, wherein the program instructions, stored on the one or more computer readable storage media, further comprise:

program instructions to apply dropout regularization to each ground truth caption in the plurality of ground truth captions.

19. The computer system of claim 15, wherein the consensus metric utilizes consensus-based image description evaluation.

20. The computer system of claim 15, wherein the consensus metric is an average cosine similarity between one or more generated captions and one or more associated ground truth captions.

* * * * *